April 12, 1932.   B. G. JOHNSON   1,853,058
AUTOMOBILE
Filed Feb. 3, 1931   4 Sheets-Sheet 4
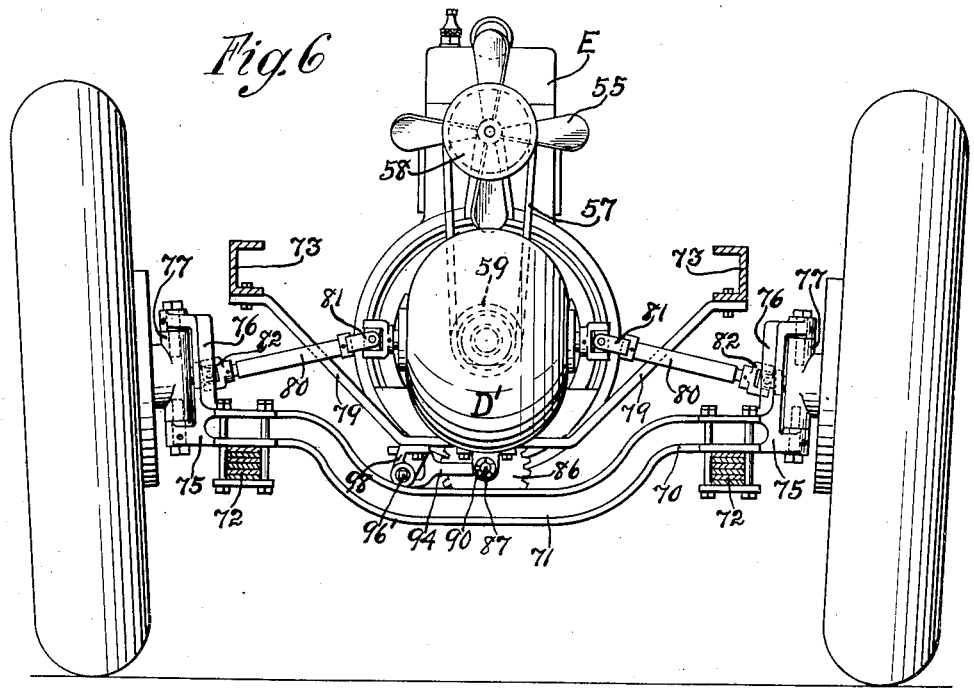
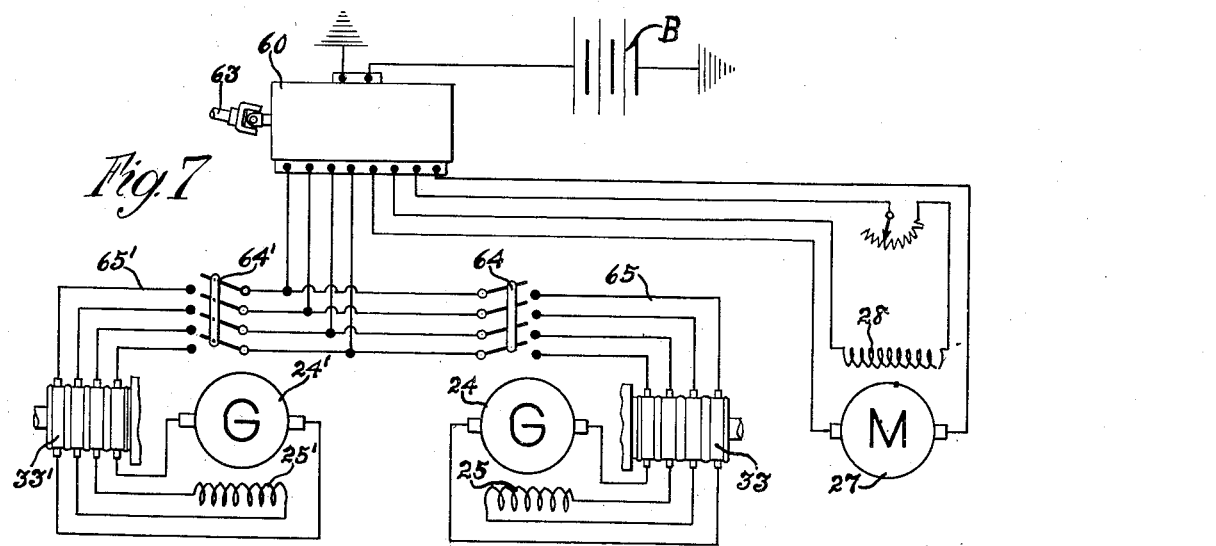
Inventor
Bror G. Johnson
by J. Daniel Stuwe
Attorney Patented Apr. 12, 1932

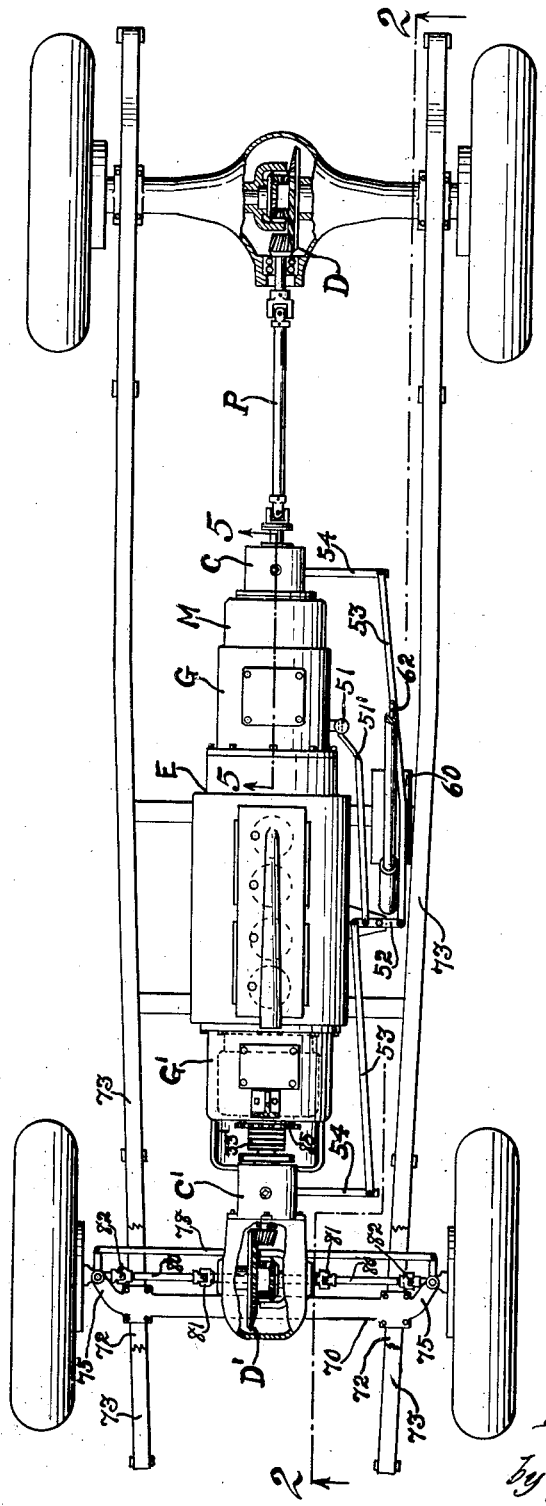

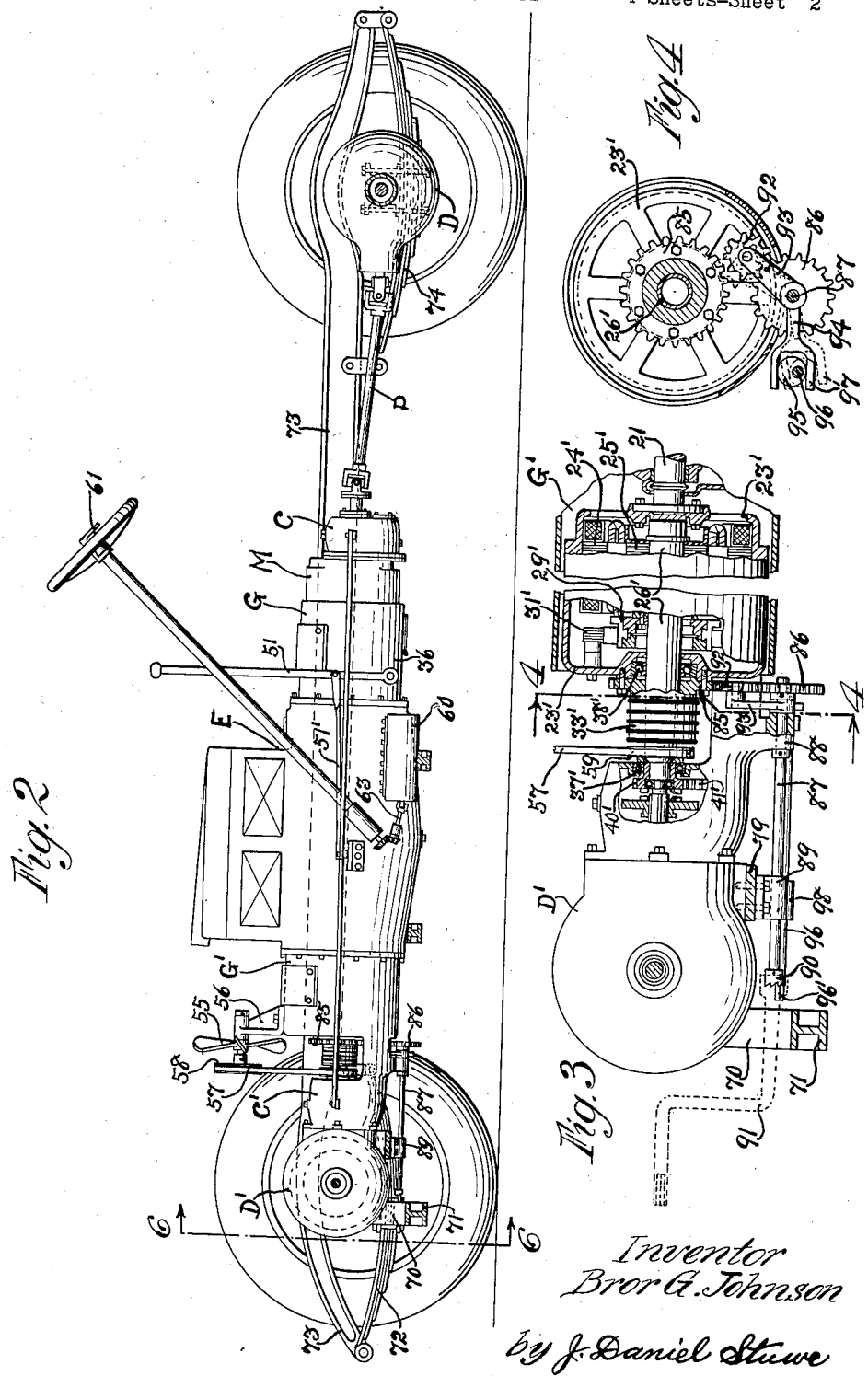

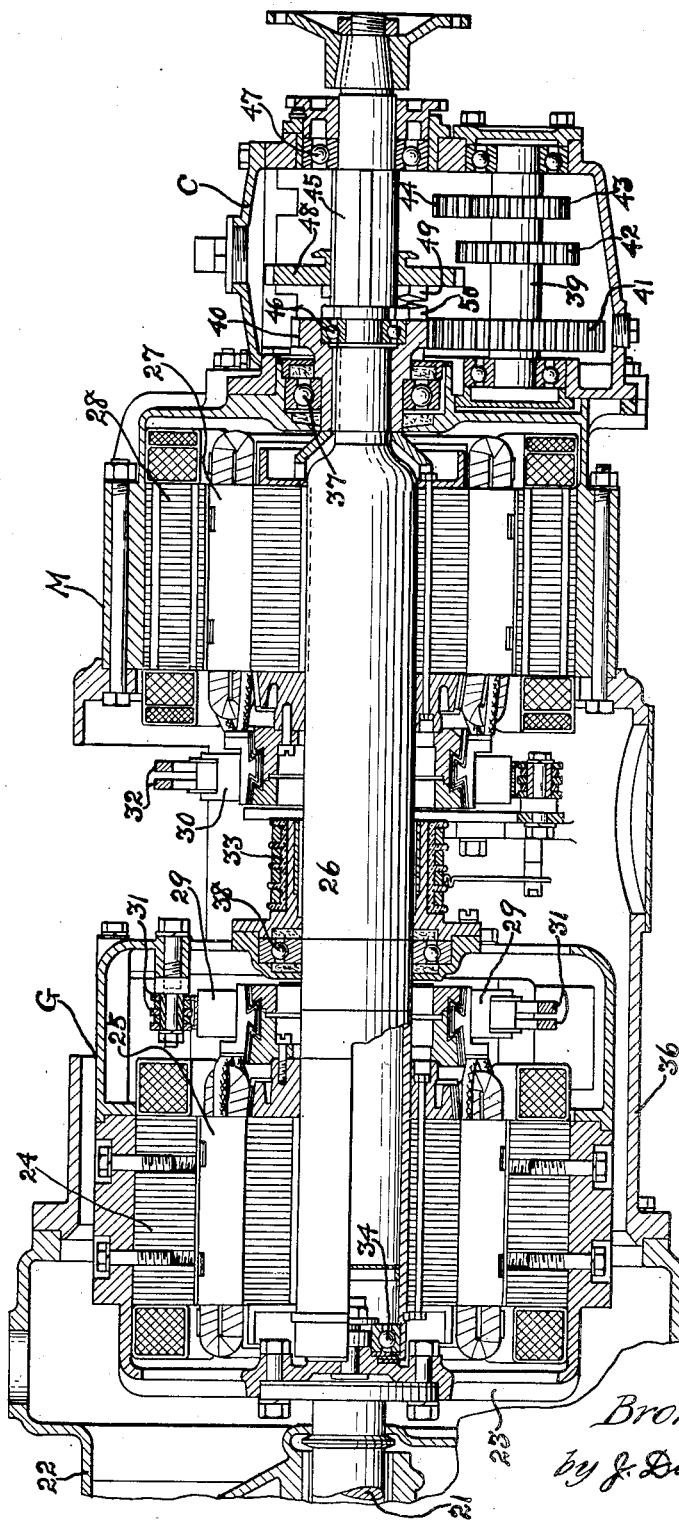

1,853,058

UNITED STATES PATENT OFFICE

BROR G. JOHNSON, OF CHICAGO, ILLINOIS

AUTOMOBILE

Application filed February 3, 1931. Serial No. 513,164.

This invention relates to improvements in an automobile; and more particularly to the type including front wheel and rear wheel driving mechanism.

One of the main objects of this invention is to provide driving means for driving all four wheels of an automobile, wherein the entire driving means operates through one main line shaft means, thereby obviating the need of any secondary shaft or sub-shaft in conjunction with the main shaft and alongside thereof, and consequently avoiding the usual intermediate connecting gears as employed in the usual four-wheel driving mechanisms, which create noise and annoyance.

Another object of this invention is to provide means and mechanism for driving all four wheels of an automobile in a silent and smooth manner, and whereby the speed can be readily increased and decreased evenly and rapidly, and either pair of wheels or both pairs may be utilized for driving the automobile, this being preferably accomplished by the use of several dynamo electric machines.

A further object is to provide improved driving means for driving the front wheels of a motor vehicle smoothly and noiselessly and at a great variation of speeds, preferably through the use of a dynamo electric machine operating in conjunction with the gasoline engine.

A still further object is to provide a novel front axle construction for supporting the front part of the automobile equipped with this improved type of driving means.

Still another object is to provide a novel engine cranking means, wherein the cranking means can be moved and retained out of and into operative cranking position.

Referring to the drawings:

Fig. 1 is a plan view of an automobile chassis equipped with my present invention.

Fig. 2 is a longitudinal vertical sectional view, taken along line 2—2 of Fig. 1.

Fig. 3 is a longitudinal vertical sectional view, on a larger scale than in Fig. 2, showing the type of dynamo electric means for driving the front wheels, also showing the novel engine cranking means.

Fig. 4 is a vertical cross-sectional view, taken on line 4—4 of Fig. 3, showing the cranking means.

Fig. 5 is an enlarged vertical sectional view, taken on line 5—5 of Fig. 1, showing a type of dynamo electric means preferred for use in driving the two sets of wheels.

Fig. 6 is an enlarged vertical cross-sectional view, taken on line 6—6 of Fig. 2.

Fig. 7 is a diagrammatic view of the dynamo electric machines and their electric connections, comprising the switches for selectively including both of the clutch generators for driving both pairs of wheels, or for including either one of said generators so as to drive either the front wheels or the rear wheels alone.

In the present day rapidly traveling automobile it is desirable that the automobile be equipped with driving means for driving all four wheels, so as to provide a safe and steady traction under the various road conditions, and to have such four wheel driving means operate as smoothly and noiselessly as possible.

I have therefore provided an improved driving means for driving all four wheels of an automobile of the present high-speed type, in a silent and smooth manner, and whereby its acceleration and deceleration in speed will be effected evenly and through an increased range of speeds. This driving means is preferably so arranged that it may be used for driving only the front wheels, or only the rear wheels, whenever such may be found advantageous or desirable for any reason.

For the purpose of this invention I employ a plurality of dynamo electric machines in conjunction with a prime mover. This prime mover is preferably an internal combustion engine or gasoline engine E, and these dynamo electric machines preferably comprise a pair of clutch generators G and G', one at the front end and one at the rear end of the engine, for driving the front wheels and the rear wheels, respectively; said dynamo electric machines further comprising a motor M which is electrically connected with both of said generators, and which receives electric current therefrom generated during the starting speeds or first speeds, and aids in driving the propeller shaft and to boost the effort of the engine as transmitted through these clutch generators. These generators and the motor also have a battery B electrically connected therewith, as indicated in Fig. 7; and when the field element and the armature element of each clutch generator travel substantially at the same speed, or become magnetically locked, this motor feeds current to said battery, for use for the lights, etc. These clutch generators are also utilized for starting the engine, being energized by current from the battery.

The two clutch generators G and G' are connected to the two ends of the engine shaft, the spider and field element of each being secured to and rotating with said shaft; and said generators are electrically connected in parallel, and are operated through one controller, as indicated in Fig. 7. The motor is mounted at the rear of the generator G; while a change-speed and reverse gear mechanism C is mounted on the rear of the motor, as best shown in Fig. 5, and a similar gear mechanism C' is mounted forward of the front generator G'. These two generators G and G' act as clutches in transmitting the engine effort or torque through the two gear mechanisms C and C' and through the propelling means including the rear propeller shaft P, to the rear and to the front differential mechanisms D and D', and therethrough to drive the rear wheels and the front wheels, respectively.

The above related means and mechanisms, providing driving means for the front wheels and for the rear wheels of the automobile, are all mounted substantially in longitudinal alinement, and by the use of alined shaft means, as is best seen from Fig. 1 of the drawings, so that the entire driving means for all four wheels operates through one, straight, main line shaft means, and provides a practically noiseless and efficient drive means for both sets of wheels.

In conjunction with the present invention I preferably employ the type of dynamo electric machine used in the Owen magnetic car, wherein the driving mechanism has been arranged and provided only for driving the rear wheels, as disclosed by the Owen Patent No. 1,491,492, April 22, 1924. The use of such dynamo electric machines for driving the rear wheels, therefore, is known and is not a part of my present invention. However, to provide a silent four wheel driving mechanism, it became my problem and it became a part of this invention to rearrange and reconstruct the forward parts of the automobile, including novel front axle and supporting means and front drive shaft means for driving the front wheels; and then to equip and supply this novel front construction with the suitable dynamo electric machine or mechanism for driving the front wheels in an efficient and silent manner; thereby providing a silent front wheel driving mechanism, and combining it with the former silent rear wheel driving mechanism; thus producing a combined silent electric driving mechanism for all four wheels of the automobile, as well as a novel electric front wheel drive.

Referring to the drawings, especially Fig. 5, the prime mover or engine E is provided with a shaft 21 and a casing 22. At the rear end of said shaft is mounted a spider 23 to which is secured the field element 24 of a dynamo electric machine, indicated as G herein. The armature element 25 of said machine is carried by the shaft 26, which is hollow and is in alinement with the engine shaft 21. Said shaft 26 preferably carries an armature 27 of another dynamo electric machine, indicated herein as M, the field element 28 of which is stationary. Each of these machines is shown provided with a commutator 29, 30, wherewith the brushes 31, 32, respectively co-operate. The collector rings 33 are located between the two machines, being adapted to be engaged by the brushes, said rings being connected electrically to the coils of the fields 24 and to the brushes 31.

A ball-and-ring bearing or anti-friction bearing 34 is supported on the rear end of the engine shaft 21, and extends within the forward end of the hollow shaft 26, thus maintaining the forward end of said shaft 26 in perfect alinement with shaft 21.

A housing 36 is secured to and extends rearwardly from the casing 22 of the engine, serving as a cover for the electrical elements and to support the field element 28 of the rear machine or motor M. A rear set of anti-friction bearings 37 are also supported on this housing, wherein the rear end of shaft 26 is rotatably supported, thus effectively maintaining the rear end of this shaft 26 properly alined, and by these two bearings 34 and 37 keeping the entire shaft 26 in alinement with shaft 21. An additional or intermediate bearing 38 is supported on the rear of spider 23 and field element 24, for the shaft 26 to rotate therein, thus also alining this field element 24 and its armature 25.

The hollow drive shaft 26 is geared at its rear end to a counter shaft 39, through gearings 40 and 41. This counter shaft carries a reduction gear 42 and a gear 43 meshing with an idler 44. A shaft 45 is maintained in alinement with shaft 26, by suitable bearings 46 and 47, and is provided with a slidable gear 48 having teeth 49 which are adapted to engage similar teeth 50 carried at the rear end of shaft 26, for effecting a direct drive of the vehicle by said shafts 26 and 45.

The above recited rear wheel driving mechanism, as used in the Owen magnetic car for driving the rear wheels thereof, is in the present invention supplemented with further dynamo electric means and mechanisms whereby to drive the front wheels in a smooth and silent manner; so as to provide a complete, smooth and silent electric drive for all four wheels of the automobile. I therefore employ another dynamo electric machine, indicated in the drawings as G', and mount it at the front end of the engine E. This machine is entirely similar in its parts to the above described dynamo electric machine G, and it has its spider 23' secured to the front end of the engine shaft 21, as best shown in Fig. 3 of the drawings, in a similar manner as the spider 23 of machine G is secured to the rear end of said shaft. Said spider carries the field element 24' of this front machine G' which also functions like a clutch generator like said machine G. The armature element 25' of this machine is carried by a hollow shaft 26' which extends forwardly of and is alined with engine shaft 21. A commutator 29' and brushes 31' to cooperate therewith are also provided; while collector rings 33' are mounted forwardly of spider 23', and anti-friction bearings 38' at the front end of the spider surround the hollow shaft 26', and bearings 37' support the front end of said shaft in the housing of change speed gear mechanism C'. Said gear mechanism also includes the gears 40' and 41', and the associated gears and elements, like in gear mechanism C, as set forth above.

Suitable levers are provided for operating the two sets of gear mechanisms in unison, the same preferably including an operating lever 51 suitably mounted and connected through a link 51' with a lever bar 52 which actuates a pair of rods 53 for operating a pair of arms 54 which extend into the gear mechanisms C' and C, to operate the gears, in the well known manner.

In this invention the fan 55 is mounted by a bracket 56 on the housing part of the front generator G', in front of the engine. It is driven preferably by a belt 57 engaging a pulley 58 on the fan shaft and a pulley 59 on hollow shaft 26', forwardly of collector rings 33'.

A control box 60 is suitably mounted on the automobile, and is operated by a controller 61, which is preferably mounted on the steering wheel and operates through a shaft 62, extending through the steering post, to actuate a shaft 63 extending forwardly of the control box. The control box and connected control means are merely indicated diagrammatically, as the same do not form a part of this invention.

The electrical arrangements and connections of the two generators and the motor and the control means and battery are indicated diagrammatically by the wiring diagram shown in Fig. 7. This indicates how the electric connections between the two generators and the motor may be controlled through the controller; and shows the cut-out switches 64 and 64' provided in the parallel circuits 65 and 65' of the generators G and G', which lead through the controller to the motor and the battery. By opening either one of these switches 64 and 64', the particular generator and the associated driving means for its pair of wheels can be placed idle, whenever such action may be found expedient, as through a short occurring in the one generator, through breakage, etc.; and the other generator and the motor are then adapted to efficiently operate in driving the automobile through its associated pair of wheels.

A front axle 70 is positioned forwardly of the axial line through the front wheels and is provided with a downwardly curved intermediate part 71, as best shown in Figs. 1 and 6; so as to provide ample freedom of movement for the front differential mechanism D' with respect to the front axle. The front springs 72 are supported by said axle and have their front ends connected to the front ends of the frame bars 73 which have their rear ends supported through rear springs 74 on the rear axle housing. Said axle 70 has each of its end portions 75 curved rearwardly and provided with a yoke 76 wherein the steering knuckle 77 of one of the front wheels is pivoted. Said front wheels are steered through any suitable steering rod 78 and suitable connected steering mechanism. Strap means 79 are secured at the ends to said frame bars 73, and on the middle part thereof is supported the front differential mechanism D', to have ample freedom of movement relative to the axle part 71, during flexing of the springs 72.

The front driving axle means or transverse drive shaft means comprises a pair of shaft sections 80, which are connected at their inner ends through universal joints 81 with the two sides of the front differential gear mechanism, and are connected at their outer ends through universal joints 82 with the stub shafts of the front wheels, for driving the wheels, as is well understood.

Novel and improved crank means is also provided herein for cranking the engine, in conjunction with this novel front wheel driving arrangement. This means comprises a gear 85 which is preferably secured at the front of the spider 23', as best shown in Figs. 3 and 4, between said spider and the collector rings 33'. A gear 86 is secured on the rear end of a rotatable operating shaft 87 which is supported in bearing knuckles 88 and 89 and has a clutch element 90 with clutch teeth on its front end, to be engaged and turned by co-operating clutch teeth on the end of a suitable crank lever 91. An idler 92 is pivotally mounted on the upper arm 93 of a bellcrank 94 which is fulcrumed on shaft 87. An eccentric 95 on a shaft 96 engages in a forked end 97 of the bellcrank to swing the latter, said shaft 96 being mounted in bracket means 98, so as to extend substantially parallel to shaft 87, and said shaft 96 preferably has a squared front end adapted to be fitted and actuated by said crank lever 91; so that by turning crank lever 91 and shaft 96 and its eccentric 95 the bellcrank 94 will be swung to positively move and hold the idler 92 in mesh with gear 85, while it is always in mesh with the other gear 86 secured on shaft 87. Thereupon the turning of shaft 87 with the crank lever will actuate the gears for cranking the engine, while these elements are in the position shown by the dotted lines in Fig. 4. After the cranking of the engine has been accomplished, the bellcrank 94 can be again swung back and the idler 92 thereby positively moved and held out of the operative position, as shown by the full lines in said Fig. 4.

It should be observed that a plurality of contacts and a plurality of starting speeds are provided for by the controller elements 60 to 63, as shown by Fig. 7, and as is well understood in this art; furthermore that a plurality of forward speeds are also provided for by the change speed gear mechanisms C and C' and the associated lever and link elements 51 to 54, as employed in this construction. It thus becomes apparent that with this improved construction and arrangement of elements and means and mechanisms, a comparatively wide range of speeds has been provided for, and that the acceleration and deceleration in speed can be effected through a comparatively wide range and in a very smooth and even manner; and that an improved, silent, electric four-wheel driving mechanism has been provided with this invention.

I claim as my invention:

1. In an automobile having front and rear wheels and front and rear differential mechanisms to operate the same, a longitudinal drive shaft means which has all its shaft parts substantially alined and has its two ends operatively connected to said two differential mechanisms, and driving means on said shaft means including a prime mover, a pair of clutch generators, whose shaft means forms part of said drive shaft means, one generator being provided for driving the front wheels and the other for driving the rear wheels.

2. In an automobile having front and rear wheels and front and rear differential mechanisms to operate the same, a longitudinal drive shaft means which has all its shaft parts substantially alined and has its two ends operatively connected to said two differential mechanisms, driving means on said shaft means for operating the same and including a pair of clutch generators, one thereof provided for driving the front wheels and the other for driving the rear wheels, and switch means for selectively cutting-out one of said generators, thereby enabling the other generator to drive the automobile through its associated pair of wheels.

3. In an automobile, driving mechanism for driving the four wheels thereof, comprising an engine and a pair of generators one at each end of said engine, one alined drive shaft means including the rotary shaft means of said engine and said generators, one generator for operating the front wheels and the other generator for operating the rear wheels, through said drive shaft means, and means for selectively excluding either one of said generators and its wheels, while utilizing the other generator and its wheels for driving the automobile.

4. In an automobile having front and rear wheels and front and rear differential mechanisms to operate the same, a longitudinal drive shaft means having its shaft parts alined and having its two ends operatively connected to said differential mechanisms, means on said shaft means for driving the same and comprising a prime mover and a pair of clutch generators also a motor all in alinement on said shaft means, a generator being connected to each end of the prime mover for driving one set of the wheels, the motor being equipped to receive the overload of current from the generators during the starting speeds, and means for selectively excluding either one of the generators and enable the other generator to drive the automobile through its set of wheels.

5. In an automobile provided with front wheels and a differential mechanism and means extending therefrom to the wheels to drive them, a driving engine, a generator having one of its rotary electric elements secured to the front end of the engine shaft, collector ring means mounted forward of said generator and electrically connected thereto, a fan mounted on the housing of said generator and in front of the engine, and means connected to said fan and to said collector ring means for driving said fan to cool said engine.

6. In an automobile provided with front wheels and a differential mechanism and means extending therefrom to the wheels to drive the same, a driving engine, a generator having one of its rotary electric elements secured to the front end of the engine shaft, a fan positioned on the housing of the generator and in front of the engine, and actuating means connected with said fan and with said generator for driving the fan to cool the engine.

In testimony whereof I have signed this specification.

BROR G. JOHNSON.